United States Patent
Hitomi et al.

(10) Patent No.: US 6,626,164 B2
(45) Date of Patent: Sep. 30, 2003

(54) AUTOMOTIVE FOUR-CYCLE ENGINE

(75) Inventors: Mitsuo Hitomi, Fuchu-cho (JP);
Yasushi Matsushita, Fuchu-cho (JP);
Tadashige Ohba, Fuchu-cho (JP)

(73) Assignee: Mazda Motor Corporation, Hiroshima (JP)

(*) Notice: Subject to any disclaimer, the term of this patent is extended or adjusted under 35 U.S.C. 154(b) by 0 days.

(21) Appl. No.: 10/073,278

(22) Filed: Feb. 13, 2002

(65) Prior Publication Data

US 2002/0166536 A1 Nov. 14, 2002

(30) Foreign Application Priority Data

Feb. 14, 2001 (JP) .......................... 2001-037526

(51) Int. Cl.⁷ .............................. F02B 47/08; F01L 1/34
(52) U.S. Cl. ................ 123/679; 123/568.14; 123/90.15
(58) Field of Search ............................. 123/679, 568.14, 123/90.15

(56) References Cited

U.S. PATENT DOCUMENTS

| 4,327,676 A | | 5/1982 | McIntire et al. |
| 5,626,109 A | * | 5/1997 | Yasumura et al. ........ 123/90.15 |
| 6,234,123 B1 | * | 5/2001 | Iiyama et al. ............ 123/90.15 |
| 6,336,436 B1 | * | 1/2002 | Miyakubo et al. ........ 123/90.15 |
| 6,422,200 B1 | * | 7/2002 | Morikawa et al. ........ 123/90.15 |

FOREIGN PATENT DOCUMENTS

| DE | 3401 362 A1 | 8/1984 |
| EP | 1 052 391 A2 | 11/2000 |
| EP | 1 085 191 A2 | 3/2001 |
| FR | 2 796 418 A1 | 7/1999 |
| JP | 50-86988 A | 4/1993 |
| JP | 10-266878 A | 10/1998 |

OTHER PUBLICATIONS

Patent Abstracts of Japan vol. 1999, No. 01, Jan. 29, 1999 & JP 10 266878 A (Toyota Motor Corp.) Oct. 6, 1998 *Abstract*.

* cited by examiner

*Primary Examiner*—Erick Solis
(74) *Attorney, Agent, or Firm*—Nixon Peabody LLP; Donald R. Studebaker

(57) ABSTRACT

A four-cycle engine is provided with valve timing adjusters for adjusting opening and closing timing an and an exhaust valve. In medium- to high-speed ranges in medium- to high-load regions of the engine, a closing point (ExC) of the exhaust valve defined as a point of transfer from an acceleration portion to a constant speed portion on its valve lift characteristics curve is set to a point a specific period before an intake top dead center, and an opening point (InO) of the intake valve defined as a point of transfer from a constant speed portion to an acceleration portion on its valve lift characteristics curve is set to a point after the intake top dead center. In addition, the period from the closing point (ExC) of the exhaust valve to the opening point (InO) of the intake valve is made longer in the medium-speed range than in the high-speed range in the medium- to high-load regions of the engine.

12 Claims, 7 Drawing Sheets

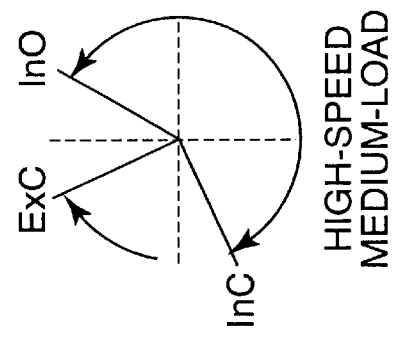
FIG.5C HIGH-SPEED MEDIUM-LOAD
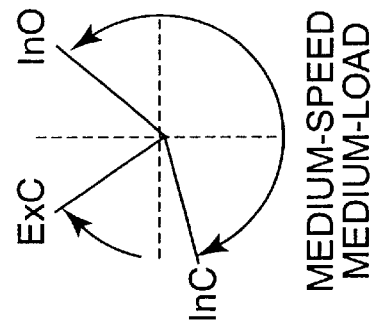
FIG.5B MEDIUM-SPEED MEDIUM-LOAD
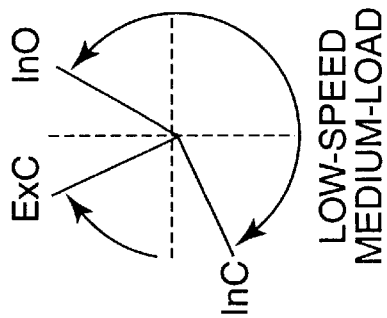
FIG.5A LOW-SPEED MEDIUM-LOAD
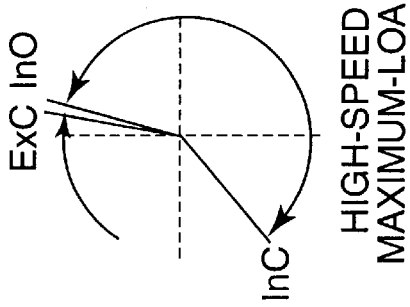
FIG.5F HIGH-SPEED MAXIMUM-LOAD
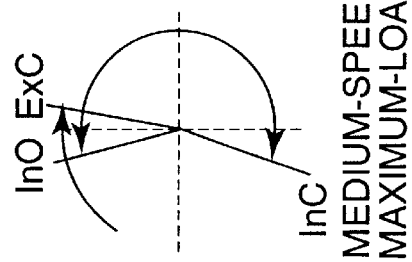
FIG.5E MEDIUM-SPEED MAXIMUM-LOAD
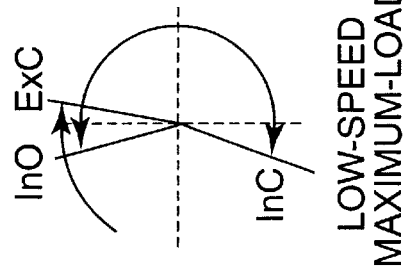
FIG.5D LOW-SPEED MAXIMUM-LOAD

LOW-LOAD

MEDIUM-SPEED
MAXIMUM-LOAD

HIGH-SPEED
MAXIMUM-LOAD

AUTOMOTIVE FOUR-CYCLE ENGINE

BACKGROUND OF THE INVENTION AND RELATED ART STATEMENT

The present invention relates to a four-cycle engine for a motor vehicle designed to use so-called "internal" exhaust gas recirculation (EGR) in a positive way by causing part of already combusted exhaust gases to remain in a combustion chamber.

EGR is a widely known conventional technique in which an exhaust air line and an intake air line of an engine are connected by an external EGR passage and part of exhaust gases is returned to the intake air line through the external EGR passage to reduce nitrogen oxides (NOx), as described in Japanese Unexamined Patent Publication No. 5-86988, for example. This Patent Publication discloses an external EGR system in which a specific amount of cooled exhaust gas (EGR gas) is re-introduced into a combustion chamber through an external EGR passage which is provided with an EGR cooler and the recirculation rate (EGR rate) is increased in higher-load ranges of the engine, so that NOx emissions are decreased and increases in combustion temperature and exhaust gas temperature are avoided in the higher-load ranges. Avoiding the increases in combustion temperature and exhaust gas temperature is advantageous for improving combustion efficiency, preventing knocking combustion, and for improving the reliability of exhaust gas converting catalysts.

Internal EGR is another form of exhaust gas recirculation technique of the prior art, in which already combusted exhaust gases are intentionally caused to remain in the combustion chamber instead of recirculating the exhaust gases through the external EGR passage. A common approach used for internal EGR is to increase the amount of overlap between open periods of intake and exhaust valves. For this purpose, an internal EGR system is usually provided with a valve timing adjuster for varying opening and closing timing of the intake and exhaust valves. The valve timing adjuster increases the amount of residual exhaust gas left in the combustion chamber by causing "blowing-back" of the exhaust gas during overlap periods, for instance, by increasing the amount of overlap in a range requiring the internal EGR.

An arrangement for adjusting the opening and closing timing of the intake and exhaust valves in accordance with engine operating conditions is disclosed in Japanese Unexamined Patent Publication No. 10-266878. According to the arrangement of this Patent Publication, the exhaust valve is closed at a point before the top dead center on an intake stroke and the intake valve is opened at a point after the top dead center on the intake stroke to cause multi-point self-ignition in the combustion chamber and to reduce pumping loss in a specific low-load operating range of the engine and, as required torque decreases, the closing point of the exhaust valve is advanced and the opening point of the intake valve is retarded.

Among the aforementioned conventional arrangements, the external EGR system shown in Japanese Unexamined Patent Publication No. 5-86988 requires that intake and exhaust systems of the engine be provided with such additional facilities as the external EGR passage, an EGR valve and the EGR cooler. While a specified portion of exhaust emissions is returned to an intake passage on a downstream side of downstream of a throttle valve and re-introduced into the combustion chamber in the engine provided with the external EGR system, it is difficult to recirculate a sufficient amount of exhaust gas under higher-load conditions in a high-speed range, because negative pressure in the intake passage decreases on the downstream side of the throttle valve and an intake period of each cylinder shortens under high-speed high-load conditions. In addition, the external EGR system is associated with a problem that exhaust gas deposits are likely to accumulate in the intake air line.

On the other hand, although the aforementioned internal EGR approach enables exhaust gas recirculation by increasing the amount of overlap between the open periods of the intake and exhaust valves, eliminating the need for the external EGR passage, it is difficult to avoid increases in combustion temperature and exhaust gas temperature in higher-load ranges because the temperature of the residual exhaust gas left in the combustion chamber is high. Furthermore, if the overlap period is fixed, it is substantially shortened and it becomes difficult to achieve sufficient internal EGR due to a decrease in effective valve opening period when the engine speed increases. Accordingly, it is necessary to significantly increase the overlap period in high-speed ranges to ensure sufficient effects of internal EGR up to the high-speed ranges. The valve opening and closing timing should be made adjustable within a wide variable range to meet this requirement, and this makes the construction of the valve timing adjuster complex. If the overlap period is increased, however, both the intake and exhaust valves would be relatively widely opened at the intake top dead center, and this makes it necessary to form a deep recess in a top surface of a piston to avoid interference between the intake and exhaust valves. This recess in the piston could exert an adverse effect on combustion in the combustion chamber.

The arrangement disclosed in Japanese Unexamined Patent Publication No. 10-266878 is intended to cause self-ignition by decomposing and radicalizing fuel in a mixture supplied into the combustion chamber with the aid of high-temperature exhaust gas, and not to avoid increases in combustion temperature and exhaust gas temperature in higher-load ranges.

SUMMARY OF THE INVENTION

In view of the foregoing, it is an object of the invention to provide an automotive four-cycle engine capable of producing sufficient effects of EGR and avoid increases in combustion temperature and exhaust gas temperature by internal EGR up to medium- to high-speed high-load ranges.

In one principal feature of the invention, an automotive four-cycle engine whose power cycle has four strokes including intake, compression, expansion and exhaust strokes, each stroke being defined as a movement of a piston in a single direction between a top dead center and a bottom dead center, is constructed such that a closing point of an exhaust valve defined as a point of transfer from an acceleration portion to a constant speed portion on its valve lift characteristics curve is set to a point a specific period before the intake top dead center between the exhaust stroke and the intake stroke and an opening point of an intake valve defined as a point of transfer from a constant speed portion to an acceleration portion on its valve lift characteristics curve is set to a point after the intake top dead center at least in medium- to high-speed ranges at least in medium- to high-load regions of the engine excluding its maximum-load region.

In this construction of the invention, the internal EGR is accomplished with already combusted gases left in a combustion chamber as the exhaust valve is closed at the point the specific period before the intake top dead center in the medium- to high-speed ranges in the medium- to high-load regions of the engine. Since the intake valve is opened after the intake top dead center, the pressure in the combustion chamber during the period from the closing point of the exhaust valve to the intake top dead center and, as a consequence, heat is sufficiently dissipated during this period when the temperature in the combustion chamber before the temperature decreases due to subsequent pressure drop after the intake top dead center. As the already combusted gases in a combustion chamber are cooled in this fashion, the effect of avoiding increases in combustion temperature and exhaust gas temperature is obtained as is the case with an external EGR system which re-introduces low-temperature exhaust gases.

According to the invention, it is preferable to set the opening point of the intake valve to a point a specific period after the intake top dead center within an earlier part of the intake stroke and provide a period during which the intake top dead center occurs and both the exhaust valve and the intake valve are closed at least in the medium-speed range at least in the medium- to high-load regions of the engine.

Preferably, the automotive four-cycle engine of the invention comprises an operating condition identifier for determining engine operating conditions based on engine speed and engine load, a valve timing adjuster capable of varying the opening and closing timing of at least the exhaust valve or the intake valve, and a controller which controls the valve timing adjuster to adjust the valve opening and closing timing according to the engine operating conditions in such a manner that the period from the closing point of the exhaust valve to the opening point of the intake valve, during which the intake top dead center occurs, becomes longer in the medium-speed range than in the high-speed range in the medium- to high-load regions of the engine when the engine operating conditions determined by the operating condition identifier indicate that the engine is at least in the medium- to high-load regions.

In this construction, the effect of progressive decreases in effective valve opening periods of the exhaust valve and the intake valve toward higher engine speeds is corrected by varying the valve timing, so that the same degree of internal EGR is obtained through the medium- to high-speed ranges in the medium- to high-load regions of the engine.

In the above construction, it is preferable to make a crank angle period from the intake top dead center to a closing point of the intake valve longer than a crank angle period from the closing point of the exhaust valve to the intake top dead center in the medium-speed range at least in the medium- to high-load regions of the engine.

Preferably, the automotive four-cycle engine of the invention comprises an operating condition identifier for determining engine operating conditions based on engine speed and engine load, a valve timing adjuster capable of varying the opening and closing timing of at least the exhaust valve, and a controller which controls the valve timing adjuster in such a manner that the closing point of the exhaust valve occurs after the intake top dead center when the engine operating conditions determined by the operating condition identifier indicate that the engine is in the maximum-load region.

In this construction, the amount of exhaust gas recirculated by the internal EGR is decreased and the amount of fresh air introduced is increased, so that sufficient engine output is produced.

In the automotive four-cycle engine of this construction, the valve timing adjuster may be of a type which varies the valve opening and closing timing by varying the phase of rotation of a cam shaft with respect to a crankshaft without altering a valve open period.

In one aspect of the invention, the closing point of the exhaust valve may be gradually retarded as the engine load approaches from that in an engine operating range in which the closing point of the exhaust valve is set to the point the specific period before the intake top dead center to that in the maximum-load region. This serves to smoothly increase the engine output.

In another aspect of the invention, the valve timing adjuster is of a type capable of individually varying the opening and closing timing of the exhaust valve and the intake valve, and both the closing point of the exhaust valve and the opening point of the intake valve are set to a point after the intake top dead center in the maximum-load region in the high-speed range of the engine. This is advantageous for ensuring that a sufficient amount of fresh air is introduced in the high-speed maximum-load range when the open period of the intake valve is relatively short.

When the automotive four-cycle engine of this invention is provided with a turbocharger, it is preferable that at least the closing point of the exhaust valve be set to a point before the intake top dead center in the maximum-load region in the medium- to high-speed ranges of the engine.

In this construction, the internal EGR is accomplished and increases in combustion temperature and exhaust gas temperature are avoided in the maximum-load region even in the medium- to high-speed ranges of the engine and, yet, a sufficient amount of fresh air is drawn in by turbocharging while the internal EGR is being executed. In particular, anti-knocking performance of the engine is increased since the increase in combustion temperature is avoided. As a result, it becomes possible to increase the engine output by turbocharging, a feature which has conventionally been unachievable due to knocking.

It is preferable for the automotive four-cycle engine provided with the turbocharger to further comprise an air-fuel ration controller for controlling the air-fuel ratio of a mixture in a combustion chamber and thereby make the air-fuel ratio equal to or larger than the stoichiometric air-fuel ratio in the maximum-load region in the medium- to high-speed ranges of the engine. Since this arrangement increases the anti-knocking performance of the engine by setting the closing point of the exhaust valve to a point before the intake top dead center in the maximum-load region in the medium- to high-speed ranges of the engine as described above, it becomes unnecessary to enrich the mixture for preventing knocking combustion. Thus, both engine output performance and fuel efficiency can be improved by increasing the air-fuel ratio up to the stoichiometric air-fuel ratio while introducing a sufficient amount of fresh air by turbocharging.

In one principal feature of the invention, an automotive four-cycle engine whose power cycle has four strokes including intake, compression, expansion and exhaust strokes, each stroke being defined as a movement of a piston in a single direction between a top dead center and a bottom dead center, is constructed such that a closing point of an exhaust valve is set to a point in a latter part of the exhaust stroke a specific period before the intake top dead center between the exhaust stroke and the intake stroke such that already combusted gases are left in a combustion chamber, and an opening point of an intake valve is set to a point after the intake top dead center such that the pressure in the combustion chamber increases during a specific period from the latter part of the exhaust stroke to the intake top dead center, at least in medium- to high-speed ranges at least in medium- to high-load regions of the engine excluding its maximum-load region.

In this construction of the invention, it is preferable to make a crank angle period from the intake top dead center to a closing point of the intake valve longer than a crank angle period from the closing point of the exhaust valve to the intake top dead center, so that the pressure in the combustion chamber after the intake top dead center gradually decreases during a longer period than the aforementioned specific period during which the pressure in the combustion chamber increases, in the medium-speed range at least in the medium- to high-load regions of the engine.

According to the aforementioned construction of the engine of the invention, it is possible to decrease NOx emissions in medium- to high-speed ranges at least in the medium- to high-load regions of the engine, improve combustion efficiency and fuel efficiency by decreasing combustion temperature, and improve the reliability and durability of an exhaust system by preventing an increase in exhaust gas temperature. The invention is also useful for preventing knocking combustion and reducing pumping loss.

These and other objects, features and advantages of the invention will become more apparent upon reading the following detailed description in conjunction with the accompanying drawings.

BRIEF DESCRIPTION OF THE DRAWINGS

FIGS. 5A–5F are diagrams showing the closing timing of the exhaust valve and the opening and closing timing of the intake valve in low-speed medium-load, medium-speed medium-load, high-speed medium-load, low-speed maximum-load, medium-speed maximum-load and high-speed maximum-load ranges;

DETAILED DESCRIPTION OF THE PREFERRED EMBODIMENTS OF THE INVENTION

The invention is now described, by way of examples, with reference to the accompanying drawings.

Figure 1:
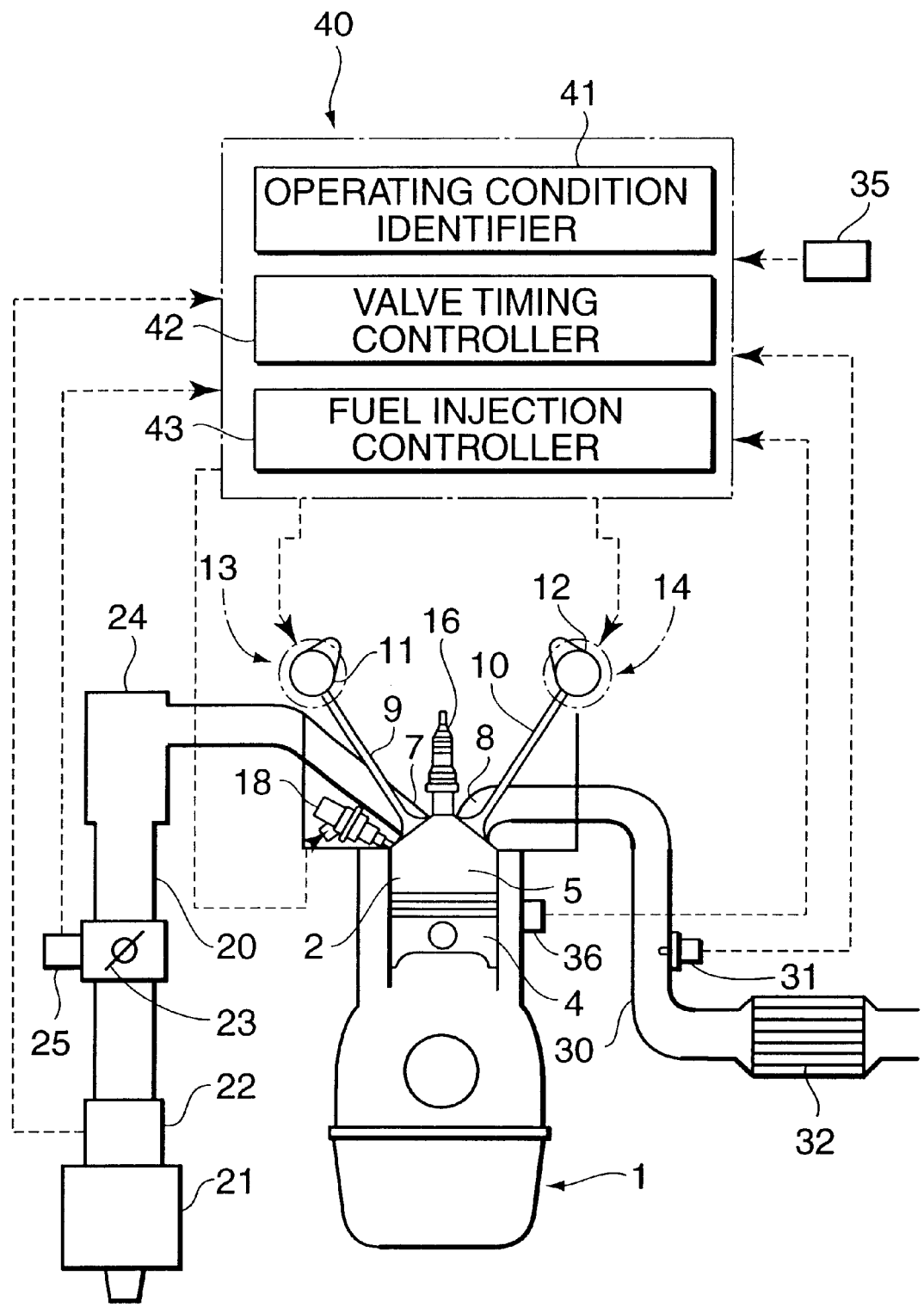
FIG. 1 is a schematic view of a four-cycle engine according to a first embodiment of the invention.

FIG. 1 is a schematic diagram showing the overall configuration of an automotive four-cycle engine according to a first embodiment of the invention. Designated by the numeral 1 in FIG. 1 is an engine body having a plurality of cylinders 2. There is formed a combustion chamber 5 in each cylinder 2 immediately above a piston 4 which is fitted in a cylinder bore. An intake port 7 and an exhaust port 8 opening into the combustion chamber 5 are opened and closed by an intake valve 9 and an exhaust valve 10, respectively.

The intake valve 9 and the exhaust valve 10 are caused to open and close by valve operating mechanisms including cam shafts 11, 12, respectively. The valve operating mechanisms for the intake valve 9 and the exhaust valve 10 are provided with respective valve timing adjusters 13, 14 for adjusting valve opening and closing timing. Provided between a cam pulley and a cam shaft which are interlocked with a crankshaft, these valve timing adjusters 13, 14 make it possible to adjust opening and closing points of the respective valves 9, 10 by varying the phase of rotation of the cam shaft with respect to the crankshaft without altering valve open periods. Neither a diagrammatic representation nor a description of the detailed construction of these valve timing adjusters 13, 14 is provided, because various kinds of such valve timing adjusters are known in the prior art.

A spark plug 16 is provided at an upper central position of the combustion chamber 5 with a far end of the spark plug 16 located inside the combustion chamber 5. Also, a far end of an injector 18 is located inside the combustion chamber 5, as if sticking out from its side, whereby fuel is injected from the injector 18 directly into the combustion chamber 5.

An intake passage 20 and an exhaust passage 30 are connected to the engine body 1. An air cleaner 21, an airflow sensor 22, a throttle valve 23 and a surge tank 24 are disposed in this order in the intake passage 20 from its upstream side to downstream side. Mechanically linked to an unillustrated accelerator pedal, the throttle valve 23 is caused to open up to a point corresponding to the amount of depression of the accelerator pedal. The throttle valve 23 is associated with a throttle opening sensor 25 for detecting the opening of the throttle valve 23.

The exhaust passage 30 is provided with an $O_2$ sensor 31 for determining the air-fuel ratio by measuring the concentration of oxygen in exhaust gas as well as a catalytic converter 32 disposed downstream of the $O_2$ sensor 31 for converting the exhaust gas. Although the catalytic converter 32 may employ either a three-way catalyst, it is preferable to use other type of catalyst which can efficiently convert NOx even under those conditions in which the air-fuel ratio is higher than the stoichiometric air-fuel ratio to provide enhanced exhaust gas cleaning performance when the engine is run at a high air-fuel ratio using stratified charge. The present embodiment employs a lean NOx catalyst which absorbs NOx in the exhaust gas in an oxygen-rich atmosphere and releases absorbed NOx and reduces it using reducing agents such as carbon monoxide (CO) present in the atmosphere when the oxygen concentration has decreased as a result of a decrease in the air-fuel ratio.

Referring again to FIG. 1, designated by the numeral 40 is an electronic control unit (ECU) for controlling the engine. The ECU 40 receives signals from the airflow sensor 22, the throttle opening sensor 25 and the $O_2$ sensor 31, a crank angle signal used for determining engine speed from a crank angle sensor 35, and a signal from a water temperature sensor 36.

Also, the ECU 40 outputs a signal for controlling fuel injection to the injector 18 and signals for controlling valve timing to the valve timing adjusters 13, 14.

The ECU 40 comprises an operating condition identifier 41, a valve timing controller 42 and a fuel injection controller 43. The operating condition identifier 41 judges engine operating conditions based on the engine speed determined by measuring the period of the crank angle signal and engine load determined from the signals input from the airflow sensor 22 and the throttle opening sensor 25, for instance.

The valve timing controller 42 sets and varies the opening and closing timing of the intake valve 9 and the exhaust valve 10 by controlling the valve timing adjusters 13, 14 according to the engine operating condition determined by the operating condition identifier 41 as will be described later in detail.

The fuel injection controller 43 controls the amount of fuel injected from the injector 18 and its injection timing according to the engine operating condition determined by the operating condition identifier 41. As an example, when the engine is in specific lower-load operating ranges (i.e., range B or low- to medium-speed ranges under low- to medium-load conditions including the range B shown in FIG. 4), the fuel injection controller 43 controls the amount of injected fuel and the injection timing in such a manner that the air-fuel ratio becomes higher than the stoichiometric air-fuel ratio and a air-fuel mixture would be locally distributed around the spark plug 16, causing stratified charge combustion, by injecting the fuel in a latter half of a compression stroke. When the engine is in other than the aforementioned specific lower-load operating ranges, on the other hand, the fuel injection controller 43 controls the amount of injected fuel and the injection timing in such a manner that the air-fuel ratio becomes equal to or close to the stoichiometric air-fuel ratio and the mixture would be dispersed to produce uniform charge combustion by injecting the fuel in during an intake stroke.

Figure 2:
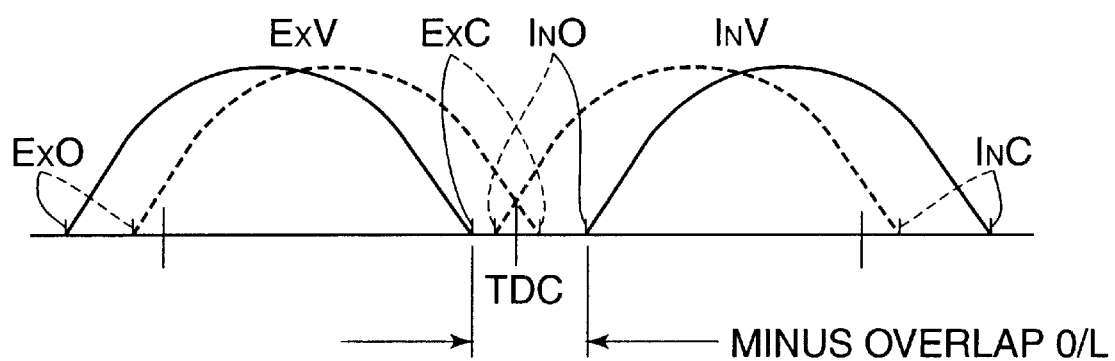
FIG. 2 is a diagram showing valve lift curves which represent opening and closing timing of intake and exhaust valves.
Figure 3:
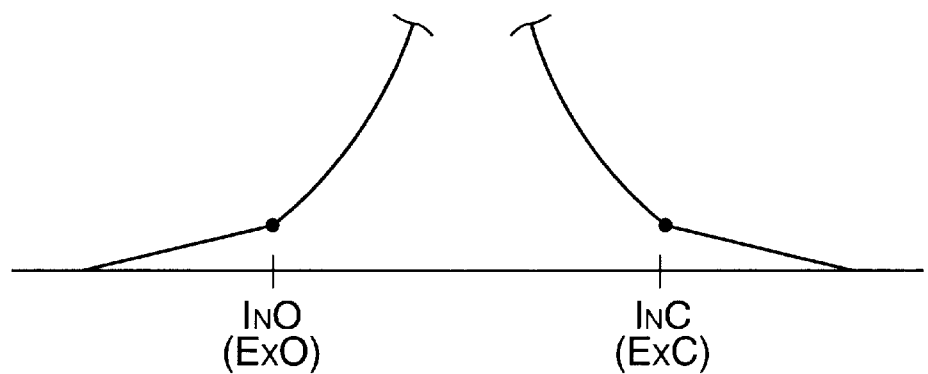
FIG. 3 is a diagram showing a partially enlarged valve lift curve.

FIG. 2 shows valve lift curves representing the opening and closing timing of the intake valve 9 and the exhaust valve 10, in which InV indicates the intake valve 9 and ExV indicates the exhaust valve 10. Also, InO and InC indicate opening and closing points of the intake valve 9 while ExO and ExC indicate opening and closing points of the exhaust valve 10. Here, the opening points InO, ExO of the intake valve 9 and the exhaust valve 10 are each defined as a point of transfer from a constant speed portion to an acceleration portion on a valve lift characteristics curve, while the closing points InC, ExC of the intake valve 9 and the exhaust valve 10 are each defined as a point of transfer from the acceleration portion to another constant speed portion on the valve lift characteristics curve (FIG. 3).

Referring to FIG. 2, the closing point ExC of the exhaust valve 10 is located ahead of the intake top dead center (TDC) as shown by a solid line when most advanced within a variable range of the opening and closing timing, and the closing point ExC of the exhaust valve 10 is located after the intake TDC as shown by a broken line when most retarded. Likewise, the opening point InO of the intake valve 9 is located ahead of the intake TDC as shown by a broken line when most advanced within a variable range of the opening and closing timing, and the opening point InO of the intake valve 9 is located after the intake TDC as shown by a solid line when most retarded. Thus, when the closing point ExC of the exhaust valve 10 is retarded and the opening point InO of the intake valve 9 is advanced as shown by the broken lines, their open periods overlap each other. In contrast, when the closing point ExC of the exhaust valve 10 is advanced and the opening point InO of the intake valve 9 is retarded as shown by the solid lines, there is no overlap between their open periods. For the purpose of explanation of the embodiment, a period between the closing point ExC of the exhaust valve 10 and the opening point InO of the intake valve 9, during which no overlap occurs, is hereinafter referred to as "minus overlap."

Described below referring to FIGS. 4 and 5A–5F is how the valve timing is set or varied according to engine operating conditions. In the following description of the invention, the opening and closing timing and open periods of the intake valve 9 and the exhaust valve 10 is expressed in terms of the crank angle, and the abbreviations BTDC and ATDC represent "before the top dead center" and "after the top dead center," respectively.

In the medium- to high-speed ranges under medium- to high-load conditions of the engine (i.e., portions of the medium- to high-load ranges excluding maximum-load and its neighboring portion), the closing point ExC of the exhaust valve 10 is set to a point a specific period ahead of the intake TDC and the opening point InO of the intake valve 9 is set to a point after the intake TDC so that the minus overlap occurs. Under the medium- to high-load conditions of the engine, the minus overlap is made larger in the medium-speed range than in the high-speed range.

Figure 4:
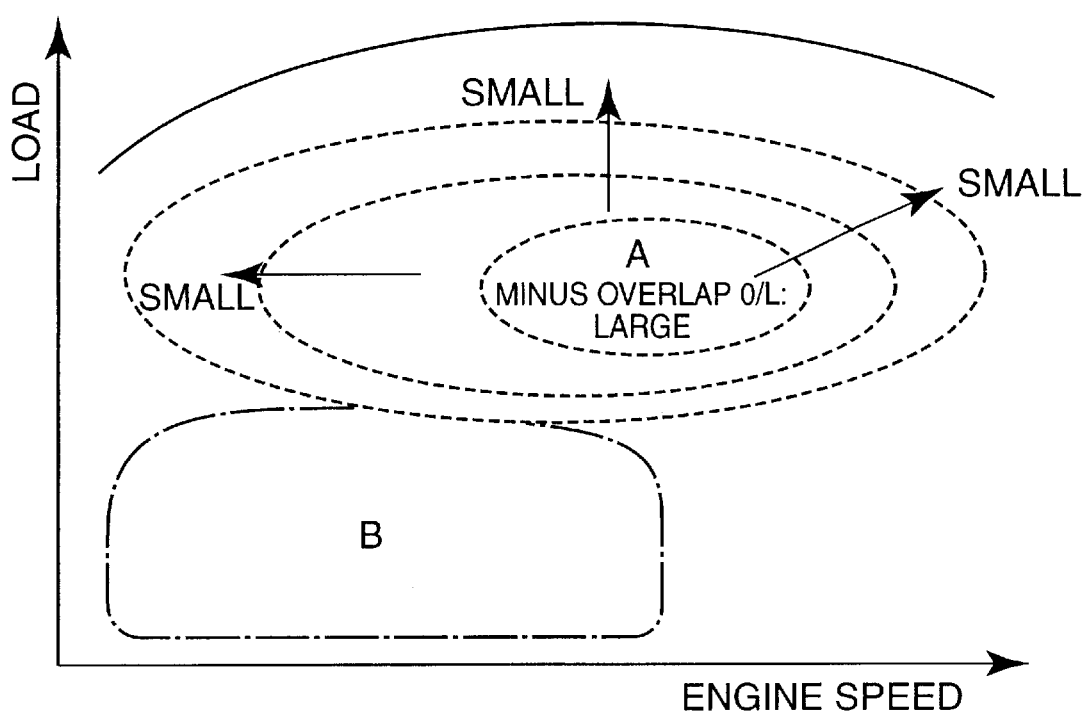
FIG. 4 is a map showing how the valve timing is set or varied according to engine operating conditions.

Specifically, the minus overlap is made the largest in the medium-speed range (range A) shown in FIG. 4 within areas of the medium- to slightly higher-load conditions of the engine. More specifically, the closing point ExC of the exhaust valve 10 is set to 20° or more before the intake TDC, preferably within a range of 30° to 40° BTDC, and the opening point InO of the intake valve 9 is set to a point after the intake TDC, preferably within a range of 35° to 45° ATDC, in a medium-speed medium-load range (within the range A) as shown in FIG. 5B. In the medium-speed medium-load range, the closing point InC of the intake valve 9 is set to about 80° after the bottom dead center (BDC) on the intake stroke and the opening point ExO of the exhaust valve 10 is set to about 80° before the BDC on the intake stroke. The valve timing adjusters 13, 14 of the present embodiment shifts the closing point InC of the intake valve 9 corresponding to a change in its opening point InO and shifts the opening point ExO of the exhaust valve 10 corresponding to a change in its closing point ExC while maintaining the open periods of the intake valve 9 and the exhaust valve 10 unchanged.

In a high-speed medium-load range in which the engine speed is higher than in the aforementioned range A, there occurs a minus overlap but its duration is made shorter than in the medium-speed medium-load range as shown in FIG. 5C. As an example, the closing point ExC of the exhaust valve 10 is set within a range of 20° to 30° BTDC and the opening point InO of the intake valve 9 is set within a range of 25° to 35° ATDC.

As the engine conditions approach from the range A to a maximum-load range, the timing of the exhaust valve 10 is gradually retarded and the timing of the intake valve 9 is gradually advanced, so that the minus overlap is gradually reduced and a "positive" overlap eventually occurs. In a medium-speed maximum-load range, the closing point ExC of the exhaust valve 10 is set to a point after the intake TDC, e.g., about 10° ATDC, and the opening point InO of the intake valve 9 is set to a point before the intake TDC, e.g., within a range of about 10° to 15° BTDC, as shown in FIG. 5E. In a high-speed maximum-load range, the closing point ExC of the exhaust valve 10 is set to a point after the intake TDC, e.g., about 10° ATDC, and the opening point InO of the intake valve 9 is set to a point after the intake TDC, e.g., within a range of 10° to 15° ATDC, as shown in FIG. 5F.

Although the valve opening and closing timing in the low-speed range is not specifically limited in this invention, the minus overlap is made smaller in a low-speed medium-load range than in the medium-speed medium-load range in the illustrated examples as shown in FIG. 5A. For example, the closing point ExC of the exhaust valve 10 is set within a range of 20° to 30° BTDC and the opening point InO of the intake valve 9 is set within a range of 25° to 35° ATDC in the low-speed medium-load range. In a low-speed maximum-load range, the closing point ExC of the exhaust valve 10 is set to about 10° ATDC and the opening point InO of the intake valve 9 is set within a range of about 10° to 15° BTDC generally in the same fashion as in the medium-speed maximum-load range as shown in FIG. 5D.

Figure 6:
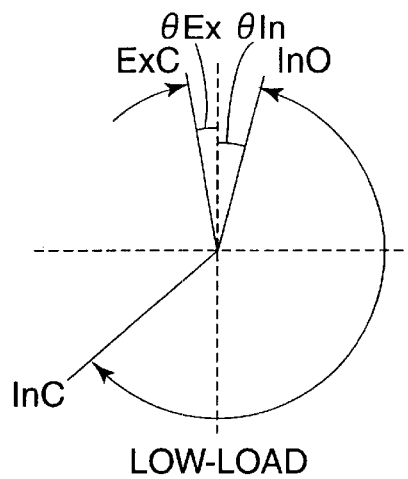
FIG. 6 is a diagram showing the closing timing of the exhaust valve and the opening and closing timing of the intake valve in a low-load range.

In the aforementioned low-load range B which is enclosed by a dot-and-dash line in FIG. 4, the closing point ExC of the exhaust valve 10 is set to 5° or more before the intake TDC, preferably within a range of about 5° to 15° BTDC, and the opening point InO of the intake valve 9 is set to a point after the intake TDC in such a manner that period θIn from the intake TDC to the opening point InO of the intake valve 9 becomes larger than period θEx from the closing point ExC of the exhaust valve 10 to the intake TDC, preferably satisfying [θIn−θEx]≧5°, or such that the opening point InO of the intake valve 9 falls within a range of about 10° to 20° ATDC, as depicted in FIG. 6. It is preferable that the period from the closing point ExC of the exhaust valve 10 to the opening point InO of the intake valve 9 be 20° or more in the range B.

In the engine of the present embodiment thus constructed, the closing point ExC of the exhaust valve 10 is set to a point a specific period (20° or more) ahead of the intake TDC and the opening point InO of the intake valve 9 is set to a point after the intake TDC in the medium- to high-speed ranges at least under the medium- to high-load conditions of the engine. This arrangement of the embodiment confers such advantageous effects as a sufficient reduction in NOx emissions due to internal EGR enabling the use of a relatively large amount of residual exhaust gas, an improvement in fuel efficiency and prevention of an increase in exhaust gas temperature achieved by an improvement in thermal efficiency due to sufficient cooling of the already combusted exhaust gas in the combustion chamber 5 by the internal EGR, a reduction in pumping loss, and prevention of knocking.

In short, the internal EGR is accomplished with the residual exhaust gas left in the combustion chamber 5 resulting in a reduction in NOx emissions if the closing point ExC of the exhaust valve 10 is set to a point ahead of the intake TDC by as much as the aforementioned specific period.

Figure 7:
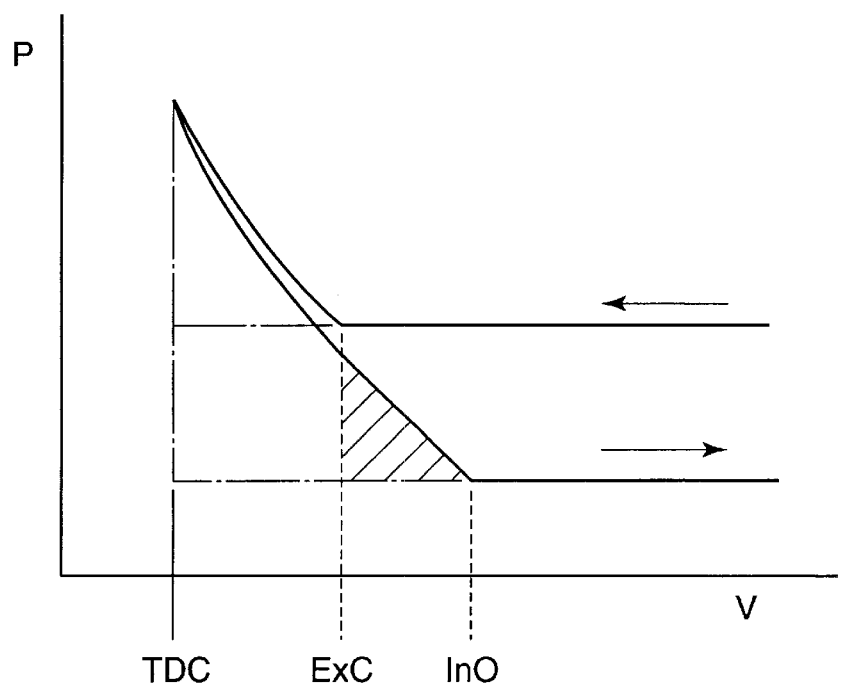
FIG. 7 is a diagram showing variations in the capacity and internal pressure of a combustion chamber from a latter part of an exhaust stroke to an earlier part of an intake stroke.

FIG. 7 shows pressure variations in the combustion chamber 5 from a latter part of an exhaust stroke to an earlier part of an intake stroke occurring when the closing point ExC of the exhaust valve 10 is set to a point ahead of the intake TDC by as much as the specific period and the opening point InO of the intake valve 9 is set to a point after the intake TDC. As can be seen from FIG. 7, the pressure in the combustion chamber 5 increases from the closing point ExC of the exhaust valve 10 to the intake TDC and decreases beyond the intake TDC. Generally, the temperature increases with pressure increase and decreases with pressure drop. During a period when the temperature in the combustion chamber 5 increases as a result of pressure increase, the amount of heat dissipated into surrounding walls of the combustion chamber 5 (including a cylinder head whose temperature is relatively low incorporating a water jacket and a cylinder wall) increases because the temperature difference between the surrounding walls and its interior increases. Therefore, even if the temperature of the residual exhaust gas left in the combustion chamber 5 is high at the closing point ExC of the exhaust valve 10, heat is sufficiently dissipated during a high-pressure period immediately after the closing point ExC of the exhaust valve 10 and the temperature decreases due to subsequent pressure drop. The effect of cooling the already combusted exhaust gas is obtained in this fashion, whereby both combustion temperature and exhaust gas temperature decrease as is the case with an external EGR system which re-introduces cooled exhaust gas through an external EGR passage.

According to the embodiment, it is necessary that the opening point InO of the intake valve 9 be located at least after the intake TDC to ensure that the pressure in the combustion chamber 5 increases from the closing point ExC of the exhaust valve 10 to the intake TDC. If the intake valve 9 is opened at a relatively early point after the intake TDC, the pressure in the combustion chamber 5 rapidly drops down to intake pressure at that point causing loss of heat-dissipating effect. In contrast, if the opening point InO of the intake valve 9 is retarded, it is possible to provide a sufficient heat-dissipating period. Thus, the effect of decreasing the combustion temperature and exhaust gas temperature is obtained if the opening point InO of the intake valve 9 is retarded to such an extent that the period from the intake TDC to the opening point InO of the intake valve 9 becomes longer than the period from the closing point ExC of the exhaust valve 10 to the intake TDC, for example. In addition, the effect of reducing pumping loss by retarding the opening point InO of the intake valve 9 in this way as will be described later in detail.

The thermal efficiency is improved by the decrease in combustion temperature, and the fuel efficiency is improved due to a combined effect of the improvement in thermal efficiency and the reduction in pumping loss. Furthermore, the decrease in exhaust gas temperature prevents an increase in the temperature of the catalytic converter 32, leading to improvements in the reliability and durability of the catalytic converter 32, and the decrease in combustion temperature produces the effect of preventing knocking in higher-load ranges.

In addition, since both the intake valve 9 and the exhaust valve 10 are closed at the intake TDC if the internal EGR is accomplished by the minus overlap, it is not necessary to form a deep recess in a top surface of the piston 4 unlike the case of the earlier-mentioned conventional internal EGR accomplished by the "positive" overlap.

According to the above-described minus overlap approach, decreases in effective valve opening periods of the intake valve 9 and the exhaust valve 10 with an increase in the engine speed exert substantially the same effect as increasing the minus overlap. It is therefore possible to sufficiently obtain such effects as recirculation of the exhaust gas by the internal EGR and decreases in combustion temperature and exhaust gas temperature even if the minus overlap is decreased in the high-speed range compared to the medium-speed range. Accordingly, the closing point ExC of the exhaust valve 10 is set within a range of 30° to 40° BTDC and the opening point InO of the intake valve 9 is set within a range of 35° to 45° ATDC in the medium-speed medium-load range as shown in FIG. 5B to increase the minus overlap, while the closing point ExC of the exhaust valve 10 is set within a range of 20° to 30° BTDC and the opening point InO of the intake valve 9 is set within a range of 25° to 35° ATDC in the high-speed medium-load range as shown in FIG. 5C to make the minus overlap smaller than in the medium-speed medium-load range, for example, thereby avoiding recirculation of an excessive amount of exhaust gas by the internal EGR and ensuring engine output while obtaining the aforementioned effects.

In the maximum-load range of the engine, the closing point ExC of the exhaust valve 10 is set to about 10° ATDC, slightly beyond the intake TDC, so that the amount of exhaust gas recirculated by the internal EGR becomes as small as possible and maximum-load torque is obtained.

The opening point InO of the intake valve 9 is advanced in the maximum-load range of the engine than in the medium-speed range, set to a point before the intake TDC (about 10° to 15° BTDC) in the medium-speed maximum-load range, and set to a point after the intake TDC (about 10° to 15° ATDC) in the high-speed maximum-load range to ensure maximum-load performance in these ranges. When the valve timing adjusters 13, 14 are of a type which varies the valve opening and closing timing without altering valve open periods, it is preferable to decrease the overlap for securing combustion stability and set a relatively short open period (e.g., about 220°) for the intake valve 9 for suppressing "blowing-back" of intake air in the low-speed range, and to retard the opening point InO of the intake valve 9 to such an extent that the blowing-back of intake air does not occur for improving intake efficiency in the high-speed range in which dead angle and a delay in intake airflow increase. If the opening point InO of the intake valve 9 is set to a point before the intake TDC when the open period of the intake valve 9 is made relatively short as described above, however, the opening point InO of the intake valve 9 becomes earlier than required for improving the intake efficiency in the high-speed range, causing a decrease in the intake efficiency.

Under these circumstances, both the closing point ExC of the exhaust valve 10 and the opening point InO of the intake valve 9 are set to points after the intake TDC in the high-speed maximum-load range so that the amount of exhaust gas recirculated by the internal EGR is decreased and the intake efficiency is improved, thereby ensuring high-speed maximum-load torque. When a relatively long open period is set for the intake valve 9, the opening point InO of the intake valve 9 may be set to a point before the intake TDC in the high-speed maximum-load range.

In the aforementioned low-load range B, the closing point ExC of the exhaust valve 10 is set to an appropriate point ahead of the intake TDC, e.g., within a range of 5° to 15° BTDC for recirculating such an amount of exhaust gas by the internal EGR that would not cause a substantial loss of combustion stability. Also, since the opening point InO of the intake valve 9 is set to a point after the intake TDC such that the period θIn from the intake TDC to the opening point InO of the intake valve 9 becomes larger than the period θEx from the closing point ExC of the exhaust valve 10 to the intake TDC by about 5° or more in the range B, it is possible to obtain a sufficient effect of reducing pumping loss.

Now, the effect of pumping loss reduction is described with reference to FIG. 7. If the intake valve 9 is closed before the intake TDC, the internal pressure of the combustion chamber 5 once increases from a level corresponding to the exhaust gas pressure, begins to decrease at the intake TDC, and decreases down to a level corresponding to the intake pressure. The difference between the internal pressure until the intake TDC is reached and the internal pressure after the intake TDC occurring in this process translates into the pumping loss. If the intake valve 9 is opened at a relatively early point after the intake TDC (e.g., if the period from the intake TDC to the opening point InO of the intake valve 9 is equal to or shorter than the period from the closing point ExC of the exhaust valve 10 to the intake TDC), the pumping loss increases due to an increase in the aforementioned internal pressure difference as the internal pressure of the combustion chamber 5 sharply drops down to the intake pressure at the opening point InO of the intake valve 9. In contrast, if the opening point InO of the intake valve 9 is retarded, the period of time needed for the internal pressure of the combustion chamber 5 to drop to the intake pressure extends, and this suppresses an increase in pumping loss by an amount indicated by a hatched area in FIG. 7.

In the low-speed maximum-load range, the opening and closing timing of the intake valve 9 and the exhaust valve 10 is set generally in the same fashion as in the medium-speed maximum-load range. In the low-speed medium-load range, the minus overlap is reduced by setting the closing point ExC of the exhaust valve 10 to a point closer to the intake TDC so that the amount of exhaust gas recirculated by the internal EGR becomes smaller than in the medium-speed medium-load range for ensuring combustion stability. It is to be noted, however, that even if the closing point ExC of the exhaust valve 10 and the minus overlap are not changed, the minus overlap and the amount of exhaust gas recirculated by the internal EGR substantially decrease due to a reduction in the dead angle when the engine speed decreases. Taking this characteristic into consideration, the closing point ExC of the exhaust valve 10 and the minus overlap in the low-speed medium-load range may be left generally at the same settings as in the medium-speed maximum-load range.

Figure 8:
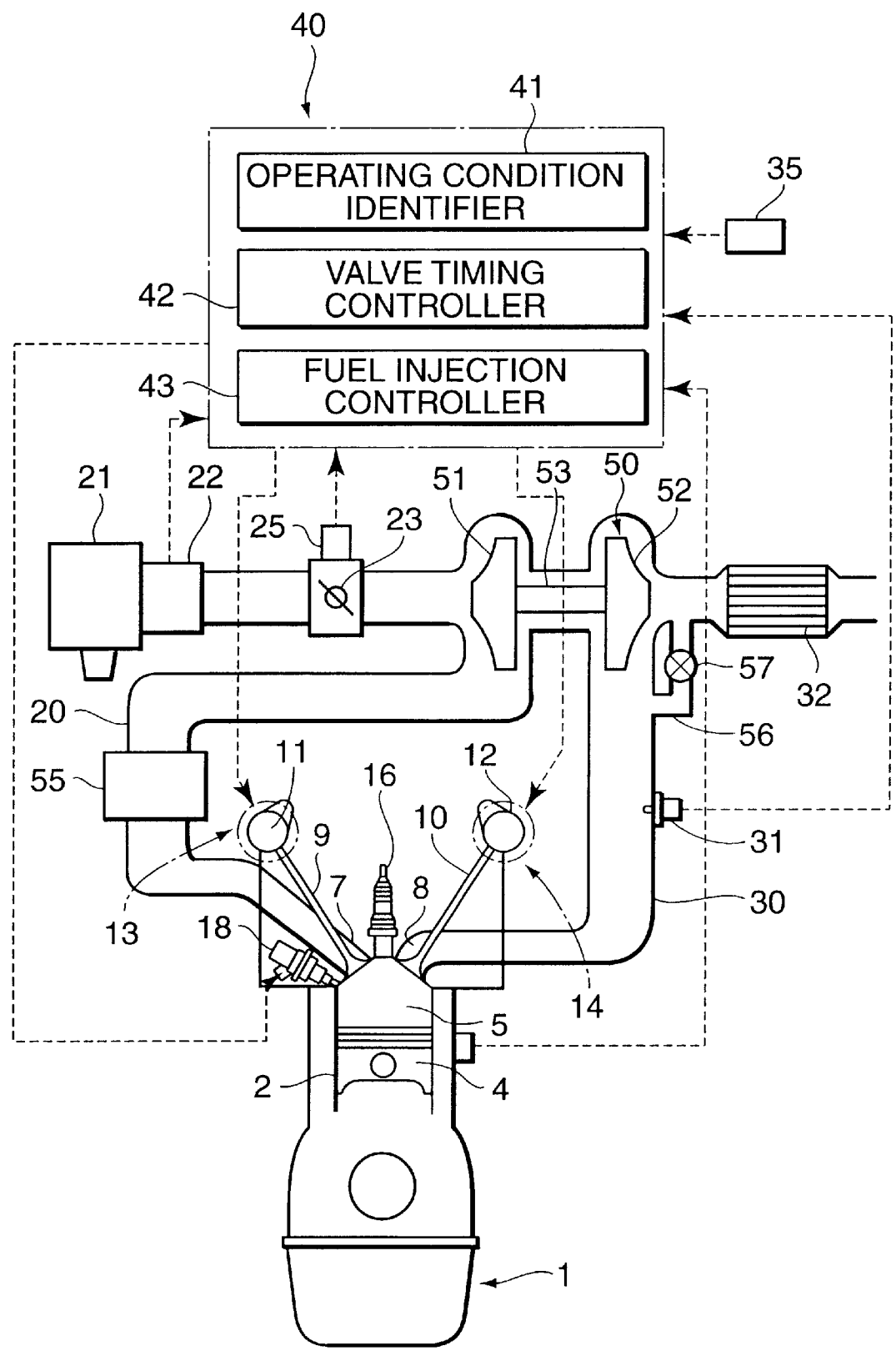
FIG. 8 is a schematic view of a four-cycle engine according to a second embodiment of the invention.

FIG. 8 shows a four-cycle engine according to a second embodiment of the invention employing a turbocharger 50 in addition to the generally same structure as the first embodiment shown in FIG. 1. The turbocharger 50 includes a compressor 51 provided in the intake passage 20, a turbine 52 provided in the exhaust passage 30 and a shaft 53 interconnecting the compressor 51 and the turbine 52. As the turbine 52 is rotated by exhaust gas flow, the compressor 51 interlocked with turbine 52 rotates, thereby producing a high charging air pressure. In FIG. 8, designated by the numeral 55 is an intercooler provided in the intake passage 20 downstream of the compressor 51, designated by the numeral 56 is a wastegate passage for bypassing the turbine 52 in the exhaust passage 30, and designated by the numeral 57 is a wastegate valve provided in the wastegate passage 56.

Figure 9A:
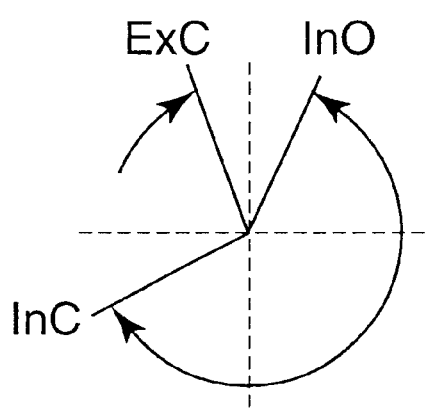
FIGS. 9A and 9B are diagrams showing the closing timing of the exhaust valve and the opening and closing timing of the intake valve in medium-speed maximum-load and high-speed maximum-load ranges according to the embodiment of FIG. 8.
Figure 9B:
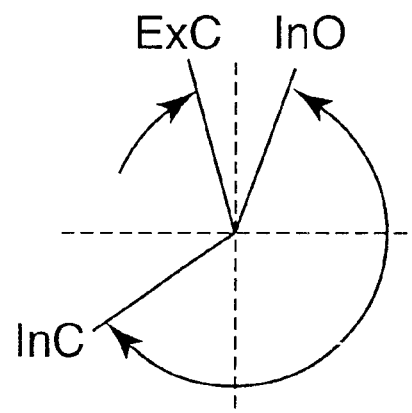

In this engine having the turbocharger 50, the opening and closing timing of the intake valve 9 and the exhaust valve 10 is controlled in a manner similar to the first embodiment in the medium-load (to higher-load) and low-load ranges (FIGS. 5A–5C and 6) with the closing point ExC of the exhaust valve 10 set to a point before the intake TDC and the opening point InO of the intake valve 9 set to a point after the intake TDC in the medium- to high-speed medium-load ranges. Also in the medium- to high-speed maximum-load ranges, the closing point ExC of the exhaust valve 10 is set to a point before the intake TDC and the opening point InO of the intake valve 9 is set to a point after the intake TDC as shown in FIGS. 9A and 9B. For example, the closing point ExC of the exhaust valve 10 is set within a range of 15° to 20° BTDC and the opening point InO of the intake valve 9 is set within a range of 20° to 25° ATDC in the medium-speed maximum-load range, and the closing point ExC of the exhaust valve 10 is set within a range of 10° to 15° BTDC and the opening point InO of the intake valve 9 is set within a range of 15° to 20° ATDC in the high-speed maximum-load range as shown in FIGS. 9A and 9B.

The fuel injection controller 43 controls the amount of injected fuel in such a manner that the air-fuel ratio becomes equal to or larger than the stoichiometric air-fuel ratio (excess-air factor $\lambda \geq 1$) not only in the low-speed and low- to medium-load ranges but also in the medium- to high-speed maximum-load ranges.

In this embodiment, the closing point ExC of the exhaust valve 10 is set to a point before the intake TDC and the opening point InO of the intake valve 9 is set to a point after the intake TDC so that the internal EGR is accomplished resulting in a reduction in NOx emissions, the already combusted exhaust gas is cooled due to the internal EGR avoiding increases in combustion temperature and exhaust gas temperature, the fuel efficiency is improved and knocking is avoided even in the medium- to high-speed maximum-load ranges.

Moreover, it is possible to obtain maximum-load torque because turbocharging makes up for a decrease in engine output caused by the internal EGR.

Conventionally, accumulation of an excessive boost pressure due to turbocharging is prevented by allowing exhaust energy to escape through a wastegate valve for the prevention of knocking in the maximum-load range and ranges close to the maximum-load range. In this embodiment, it is possible to efficiently obtain maximum-load torque in these ranges by reducing the opening of the wastegate valve 57 and thereby increasing the boost pressure by use of the exhaust energy which has conventionally been disposed of. Furthermore, since the effect of preventing knocking combustion is achieved by use of the aforementioned minus overlap, it becomes possible to increase the boost pressure beyond the extent to which the decrease in engine output caused by the internal EGR is compensated for and to increase the maximum-load torque.

Furthermore, since the effect of preventing knocking combustion is obtained even in the maximum-load range due to the minus overlap as described above, it is not necessary to enrich the mixture for preventing the knocking combustion but it is only needed to make the air-fuel ratio equal to or larger than the stoichiometric air-fuel ratio ($\lambda \geq 1$) in the maximum-load range. While the knocking combustion is avoided due to the minus overlap in the maximum-load range as stated above, a sufficient amount of fresh air is drawn in by turbocharging and the amount of injected fuel is controlled according to the amount of fresh air so that the air-fuel ratio matches the stoichiometric air-fuel ratio. As a result, both engine output performance and fuel efficiency are improved.

According to the invention, the valve timing adjuster is not limited to the type described in the foregoing embodiments but may be of any other type capable of varying the opening and closing timing of an intake or exhaust valve. The invention is also applicable to a valve actuator which is not provided with a cam shaft.

This application is based on Japanese patent application serial no. 2001-37526, filed in Japanese Patent office on Feb. 14, 2001, the contents of which are hereby incorporated by reference.

Although the present invention has been fully described by way of example with reference to the accompanied drawings, it is to be understood that various changes and modifications will be apparent to those skilled in the art. Therefore, unless otherwise such changes and modifications depart from the scope of the present invention hereinafter defined, they should be construed as being included therein.

What is claimed is:

1. An automotive four-cycle engine whose power cycle has four strokes including intake, compression, expansion and exhaust strokes, each stroke being defined as a movement of a piston in a single direction between a top dead center and a bottom dead center, wherein a closing point of an exhaust valve defined as a point of transfer from an acceleration portion to a constant speed portion on its valve lift characteristics curve is set to a point a specific period before the intake top dead center between the exhaust stroke and the intake stroke and an opening point of an intake valve defined as a point of transfer from a constant speed portion to an acceleration portion on its valve lift characteristics curve is set to a point after the intake top dead center at least in medium- to high-speed ranges at least in medium- to high-load regions of the engine excluding its maximum-load region.

2. The automotive four-cycle engine according to claim 1, wherein the opening point of the intake valve is set to a point a specific period after the intake top dead center within an earlier part of the intake stroke and a period during which the intake top dead center occurs and both the exhaust valve and the intake valve are closed is provided at least in the medium-speed range at least in the medium- to high-load regions of the engine.

3. The automotive four-cycle engine according to claim 1, comprising:
  an operating condition identifier for judging an engine operating condition based on an engine speed and an engine load;
  a valve timing adjuster for varying the opening and closing timing of at least the exhaust valve or the intake valve; and
  a controller which controls the valve timing adjuster to adjust the valve opening and closing timing according to the engine operating condition in such a manner that the period from the closing point of the exhaust valve to the opening point of the intake valve, during which the intake top dead center occurs, becomes longer in the medium-speed range than in the high-speed range in the medium- to high-load regions of the engine when the engine operating condition determined by the operating condition identifier indicates that the engine is at least in the medium- to high-load regions.

4. The automotive four-cycle engine according to claim 3, wherein a crank angle period from the intake top dead center to a closing point of the intake valve is made longer than a crank angle period from the closing point of the exhaust valve to the intake top dead center in the medium-speed range at least in the medium- to high-load regions of the engine.

5. The automotive four-cycle engine according to claim 1, comprising:
  an operating condition identifier for judging an engine operating condition based on an engine speed and an engine load;
  a valve timing adjuster for varying the opening and closing timing of at least the exhaust valve; and
  a controller which controls the valve timing adjuster in such a manner that the closing point of the exhaust valve occurs after the intake top dead center when the engine operating condition determined by the operating condition identifier indicates that the engine is in the maximum-load region.

6. The automotive four-cycle engine according to claim 5, wherein the valve timing adjuster varies the valve opening and closing timing by varying the phase of rotation of a cam shaft with respect to a crankshaft without altering a valve open period.

7. The automotive four-cycle engine according to claim 5, wherein the closing point of the exhaust valve is gradually retarded as the engine load approaches from that in an engine operating range in which the closing point of the exhaust valve is set to the point the specific period before the intake top dead center to that in the maximum-load region.

8. The automotive four-cycle engine according to claim 5, wherein the valve timing adjuster is of a type capable of individually varying the opening and closing timing of the exhaust valve and the intake valve, and both the closing point of the exhaust valve and the opening point of the intake valve are set to a point after the intake top dead center in the maximum-load region in the high-speed range of the engine.

9. The automotive four-cycle engine according to claim 1, further comprising a turbocharger, wherein at least the closing point of the exhaust valve is set to a point before the intake top dead center in the maximum-load region in the medium- to high-speed ranges of the engine.

10. The automotive four-cycle engine according to claim 9, further comprising an air-fuel ration controller for controlling the air-fuel ratio of a mixture in a combustion chamber, wherein the air-fuel ratio is made equal to or larger than the stoichiometric air-fuel ratio in the maximum-load region in the medium- to high-speed ranges of the engine.

11. An automotive four-cycle engine whose power cycle has four strokes including intake, compression, expansion and exhaust strokes, each stroke being defined as a movement of a piston in a single direction between a top dead center and a bottom dead center, wherein a closing point of an exhaust valve is set to a point in a latter part of the exhaust stroke a specific period before the intake top dead center between the exhaust stroke and the intake stroke such that already combusted gases are left in a combustion chamber, and an opening point of an intake valve is set to a point after the intake top dead center such that the pressure in the combustion chamber increases during a specific period from the latter part of the exhaust stroke to the intake top dead center, at least in medium- to high-speed ranges at least in medium- to high-load regions of the engine excluding its maximum-load region.

12. The automotive four-cycle engine according to claim 11, wherein a crank angle period from the intake top dead center to a closing point of the intake valve is made longer than a crank angle period from the closing point of the exhaust valve to the intake top dead center, so that the pressure in the combustion chamber after the intake top dead center gradually decreases during a longer period than said specific period during which the pressure in the combustion chamber increases, in the medium-speed range at least in the medium- to high-load regions of the engine.

* * * * *